that[19]

United States Patent

Takechi et al.

[11] 4,307,433
[45] Dec. 22, 1981

[54] OZONIZER

[75] Inventors: Taichi Takechi, Yokohama; Hideomi Takahashi; Hiroshi Akimoto, both of Tokyo; Hiroshi Tomiki, Fuchu, all of Japan

[73] Assignee: Tokyo Shibaura Denki Kabushiki Kaisha, Kawasaki, Japan

[21] Appl. No.: 141,658

[22] Filed: Apr. 18, 1980

[30] Foreign Application Priority Data

Apr. 24, 1979 [JP] Japan .................................. 54-49634

[51] Int. Cl.³ .......................... H01J 9/18; F24F 3/16
[52] U.S. Cl. ...................................... 361/231; 29/882;
29/883; 128/202.25; 313/291
[58] Field of Search ................... 361/231; 55/140, 141,
55/146, 150; 313/291; 29/882, 883, 858, 825;
128/202.25

[56] References Cited

U.S. PATENT DOCUMENTS

| 906,081 | 12/1908 | Steynis | 128/202.25 X |
| 1,505,669 | 8/1924 | Quain | 128/202.25 X |
| 2,420,311 | 5/1947 | Gowell | 313/291 X |
| 4,109,290 | 8/1978 | Gallagher | 361/231 |

Primary Examiner—J. D. Miller
Assistant Examiner—Reinhard J. Eisenzopf
Attorney, Agent, or Firm—Oblon, Fisher, Spivak, McClelland & Maier

[57] ABSTRACT

An ozonizer which comprises a flat hollow metal grounded electrode and a discharge electrode plate spaced apart therefrom by a discharge space. The discharge electrode plate includes a flat hollow dielectric member, a high voltage electrode formed on the inner surface of the dielectric member, a spacer material provided within and held in a clamped state by the dielectric member, a lead conductor provided within and held in a clamped state by the spacer material and a connector connecting the lead conductor and high voltage electrode.

19 Claims, 17 Drawing Figures

OZONIZER

This invention relates to an ozonizer for ozonizing air or oxygen in an air within a space formed between a high voltage electrode and a grounded electrode with application of a high voltage across the space and also to a method of manufacturing electrodes used for such an ozonizer.

Figure 1:
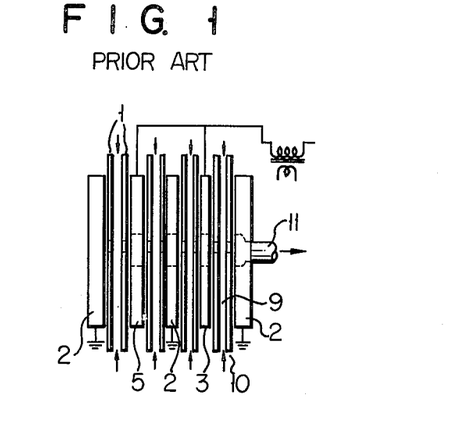
FIG. 1 is a schematic view of a prior-art plate type ozonizer.
Figure 2:
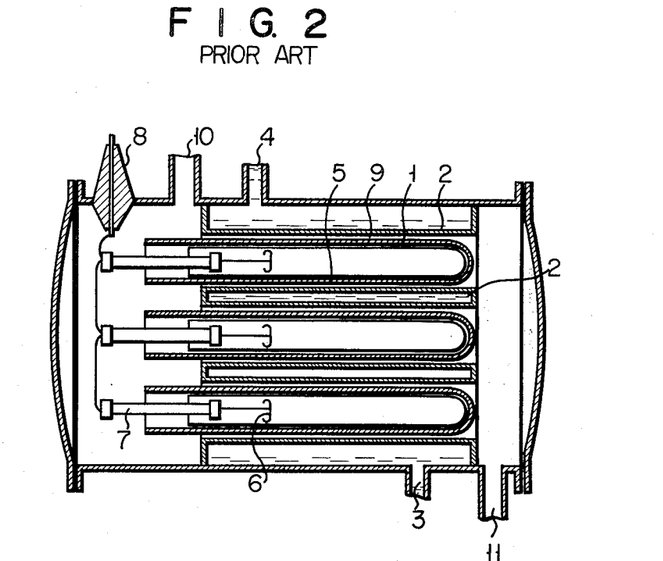
FIG. 2 is a schematic view of a prior-art tubular type ozonizer.

As the ozonizer, a plate type or so-called Otto type ozonizer as shown in FIG. 1 or a tubular type or so-called Siemens type oxonizer as shown in FIG. 2 are well known in the art. In FIGS. 1 and 2, like parts are designated by like reference numerals for faciliating the understanding. As the dielectric, as shown at 1, the ozonizer of FIG. 2 uses hollow discs having a central hole which constitutes a path of air or oxygen, while the ozonizer of FIG. 2 uses glass tubes having a bottom. The grounded electrode, as shown at 2, is cooled by cooling water. In FIG. 1, the cooling water duct is not shown. In the ozonizer of FIG. 2, the cooling water enters the ozonizer from an inlet 3, and after cooling the tubular grounded electrodes 2 it is withdrawn through an outlet 4. The high voltage electrode 5 is made of the same material as the grounded electrode 2 in the case of FIG. 1, while in the case of FIG. 2 it is in the form of, for instance, a conductive layer or lining formed on the inner surface of the glass tube 1. In the ozonizer of FIG. 2, each high voltage electrode 5 is connected through a contactor 6, a fuse 7 and a terminal tube 8 to a high AC voltage source (not shown). In FIG. 1, the tank and terminal tube are not shown. When a voltage of several ten to several thousand volts is applied between the electrodes 2 and 3, corona discharge is produced across a discharge space 9, and air or oxygen introduced into the ozonizer from an inlet 10 is ozonized in the discharge space 9 and then taken out through an outlet 11 for use.

The dielectric substance of the ozonizer is required to have a high dielectric constant, have a high insulation resistance and is free from deterioration within the corona discharge or ozone, and these properties are very important factors determining the performance of the ozonizer. The dielectric substance is selected from borosilicate glass, lead glass or alumina silica glass, and most ozonizers for industrial purposes use these glass materials. These types of glass, however, are used for special purposes only, so that they can be commercially available only in a limited form. More particularly, although they can be readily available in the form of tubes, thin plates of these glasses are not usually manufactured and thus hardly available. A predominating proportion of commercially available ozonizers are tubular type oxonizers using glass tubes, and this is because of the fact that glass tubes are readily available.

The tubular type and plate type ozonizers have their respective merits and demerits. A demerit of the tubular type is that it is bulky. The useful space for the ozonizer to perform its function is the corona discharge space, and a space other than that is occupied by the high voltage and grounded electrodes which are necessary for the corona discharge and the cooling medium duct for cooling these electrodes is an extra space. Usually, in the tubular type ozonizer as shown in FIG. 2 the space inside the glass tube 1 and the space defined between adjacent glass tubes 1 when they are arranged in a closest density arrangement have no bearing upon the function of the ozonizer. From this ground, the tubular type ozonizer usually has a large size compared to the plate type ozonizer. A merit of the tubular type ozonizer is that it is capable of ready maintenance; since the individual glass tubes 1 in this ozonizer are inserted in the respective grounded electrodes 2, a faulty glass tube alone may be readily replaced.

The plate type ozonizer has a merit that it is comparatively small in size for it involves less extra space. However, since this ozonizer has a construction obtained alternately stacking electrode plates and dielectric plates and providing the electrode plates with means for supplying a cooling medium thereto, its maintenance and inspection are not as easy; it is difficult to replace only a faulty high voltage electrode or dielectric plate.

An object of the invention is to provide an ozonizer, which is almost free from an extra space having nothing to do with its function, and with which dielectric members and high voltage electrodes can be readily taken out for replacement.

According to the invention, there is provided an ozonizer, which comprises a grounded electrode essentially consisting of a flat hollow metal tube; a flat hollow dielectric member held within the grounded electrode and defining a discharge space together therewith; a high voltage electrode formed on the inner surface of the dielectric member; a spacer material disposed within and clamped by the dielectric member provided with the high voltage electrode and serving to give a suitable curvature to opposite curved edge portions of the dielectric member and the high voltage electrode; a lead conductor inserted in the spacer material and serving to pass current to the high voltage electrode and a connecting means connecting the lead conductor and the high voltage electrode.

The spacer material is capable of withstanding heat and sufficiently thick to provide for a suitable curvature to the opposite curved edge portions of the dielectric member and high voltage electrode. Its thickness depends upon an overvoltage multiple number of the electrodes of the ozonizer, and usually it suitably ranges from about 1 to 3 mm.

This invention can be more fully understood from the following detailed description when taken in conjunction with the accompanying drawings, in which.

Figure 3:
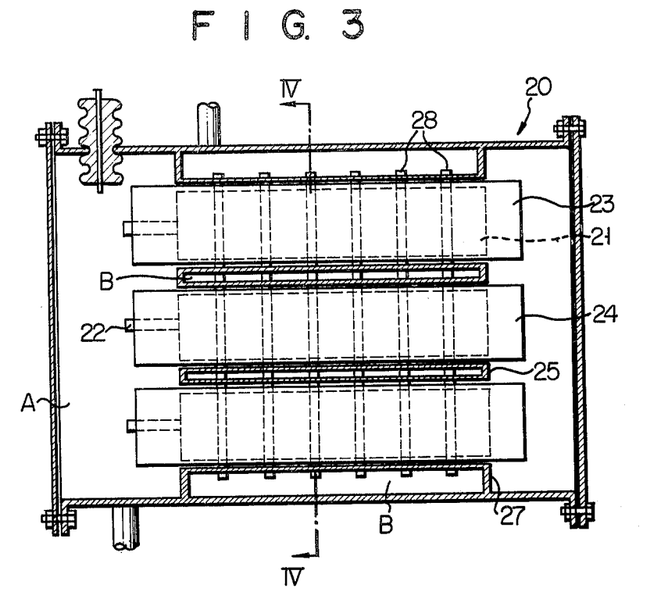
FIG. 3 is a schematic sectional view of an ozonizer according to the invention.
Figure 4:
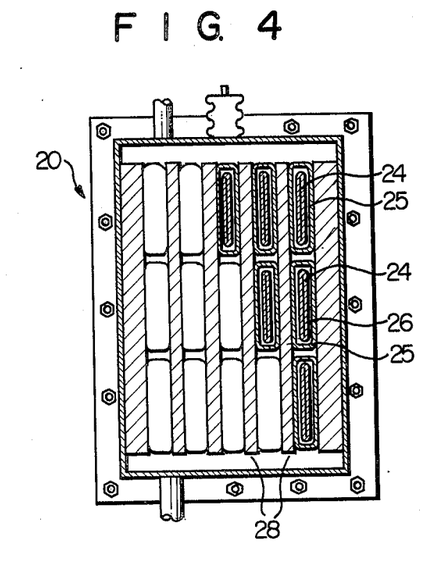
FIG. 4 is a sectional view taken along line IV—IV in FIG. 3.

Referring now to FIGS. 3 and 4, discharge electrode plates 24, which each comprise a spacer material (not shown), a high voltage electrode 21, a connecting means (not shown), a lead conductor 22 and a dielectric member 23, are accommodated within respective flat hollow grounded electrodes 25 and set apart therefrom by spacers (not shown) to define a suitable discharge space 26. Each of the grounded electrodes 25 is integrally coupled together, and the assembly is welded at the opposite ends to end plates 27. Thus, in this ozonizer, designated at 20, a flow chamber A, through which air or oxygen to be ozonized flows, and a flow chamber B, through which cooling water flows, are formed. Spacer rods 28 are provided at a suitable interval for preventing the grounded electrodes 25 from being expanded by the pressure of air or oxygen flowing through their respective discharge space 26.

It will be seen from FIGS. 3 and 4 that the ozonizer according to the invention is almost free from an extra space which has nothing to do with the function thereof and that the individual discharge electrode plates can be readily taken out for repair or replacement.

The discharge electrode plate will now be described in detail.

The inventors have trial manufactured and tested flat discharge electrode plates which can be inserted into a grounded electrode consisting of a flat hollow metal tube.

Figure 5:
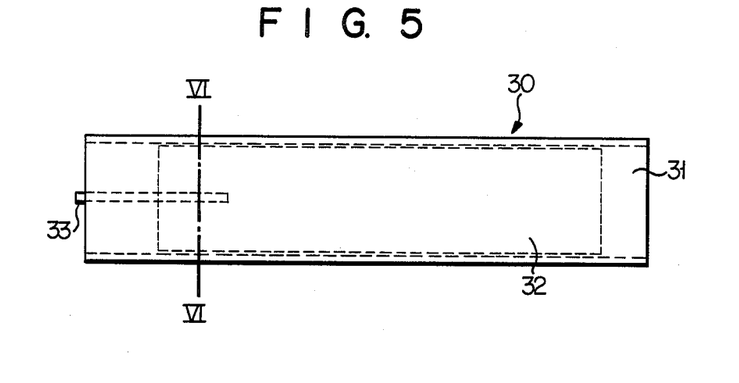
FIG. 5 is a view showing a discharge electrode plate of trial manufacture.
Figure 6:
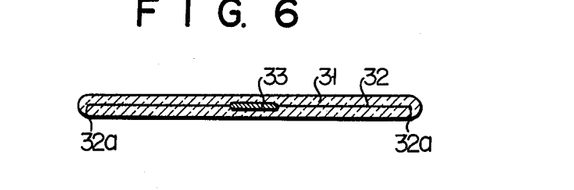
FIG. 6 is an enlarged-scale sectional view taken along line VI—VI in FIG. 5.
Figure 7:
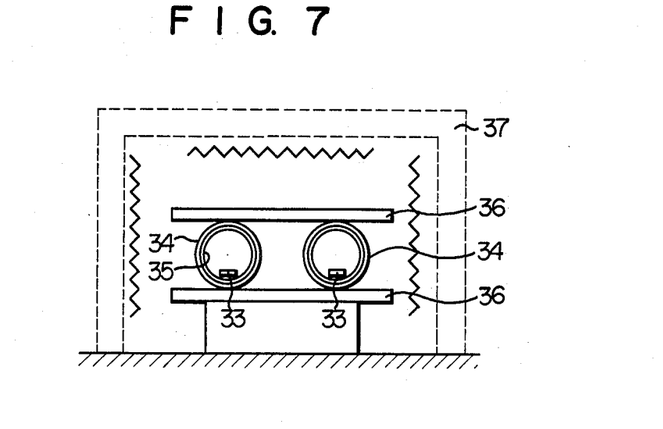
FIG. 7 is a schematic view showing a set-up for a thermal press process in the manufacture of the discharge electrode plate.

FIGS. 5 and 6 show a discharge electrode plate 30, which has been first tested. It includes a high voltage electrode 32 and a lead conductor 33 both held in a clamped state by a dielectric member 31 which is obtained by deforming a glass tube into a flat form. This discharge electrode plate 30 is produced by coating a conductive film 35 on the inner surface of the glass tube 34 or applying a coiled aluminum foil to the inner surface, inserting the lead conductor 33 into the resultant assembly and then deforming the glass tube 34, for instance in a set-up as shown in FIG. 7, into a flat form. In the set-up of FIG. 7, each glass tube 34 which is provided on the inner surface with the aluminum foil or conductive film 35 is held sandwiched between upper and lower press molds 36 with the lead conductor 33 inserted in the assembly, and the system is heated in a heating furnace 37 up to the melting point of the glass. In this process, the glass tube 34 is deformed by the weight of the upper mold 36, but it is also possible to apply a pressure from above by a suitable means. The press mold 36 used is made of a material which cannot be fusion bonded to the glass, for example graphite. Also, when cooling the glass tube after the deformation slow cooling is necessary at temperatures in the neighborhood of the slow cooling point of the glass lest strain should be left.

Figure 8:
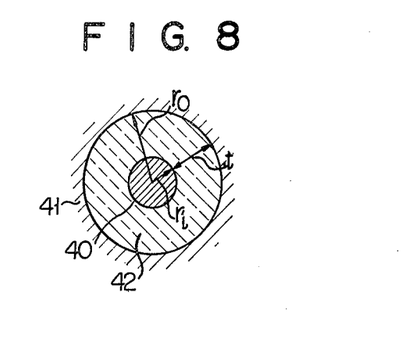
FIG. 8 is a sectional view of a coaxial cylindrical electrode for illustrating dielectric breakdown.

The first tested discharge electrode plate 30 has been found to have a drawback. That is, as shown in FIG. 6, the opposite edges 32a of the high voltage electrode 32 is sharp like a blade so that, with application of a high voltage, portions of the dielectric member 31 in contact with the edges 32a receive a very high electric stress and are likely to undergo dielectric breakdown. This phenomenon will be discussed in connection with FIG. 8, which is provided to facilitate the understanding of this phenomenon. The illustrated coaxial cylindrical electrode comprises an inner electrode 40 with a radius $r_i$, an outer electrode 41 with a curvature of radius of $r_0$ and a dielectric material 42 between these electrodes. The thickness t of the dielectric material 42 is equal to $(r_0 - r_i)$. When a voltage U is applied between these electrodes, the average electric field intensity $\bar{E}$ and maximum electric field intensity E are respectively.

$$\bar{E} = U/t$$

$$E = \frac{U}{2.3 \, r_i \log r_o/r_i}$$

Figure 9:
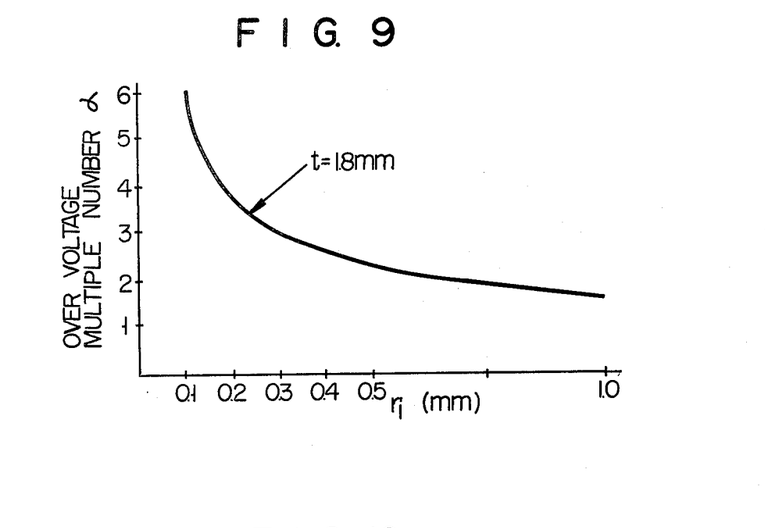
FIG. 9 is a graph showing the relation between the overvoltage multiple number and radius of the inner electrode of the coaxial cylindrical electrode.

It will be seen that the maximum electric field intensity E is higher the smaller the radius $r_i$ of the inner electrode 40. FIG. 9 shows the overvoltage multiple number $\alpha$ ($\alpha = E/\bar{E}$) obtained when the radius $r_i$ of the inner electrode 40 is varied from 0.1 to 3 mm and the thickness of the dielectric material 42 is set to 1.8 mm. It will be seen from the above description and also from FIG. 9 that the smaller the radius of the inner electrode 40, the electric field intensity of the dielectric material is the larger, that is, the dielectric breakdown is the more likely to result.

The inventors have accordingly developed a discharge electrode plate, with which a suitable curvature is provided to the opposite edges of the high voltage electrode so that it is free from the dielectric breakdown. This discharge electrode plate is characterized in that a spacer material having a suitable thickness, for example 1 to 3 mm, is provided within and held in a clamped state by a flat hollow dielectric member provided on the inner surface thereof with a high voltage electrode. The spacer material is suitably a soft heat-resistant material such as mica sheet, glass cloth and asbestos cloth. Also, it is possible to use a material capable of being softened and deformed at an elevated temperature at the time of manufacture of the discharge electrode plate such as a glass tube. This spacer material is preferably a dielectric material, but its portions other than a creeping portion extending along the discharge electrode plate may be a conductive material as will be described later.

Some specific examples of the discharge electrode plate according to the invention will now be described. They are manufactured in the same manner as the method described above in connection with FIG. 7 except for inserting a spacer material and a connecting means into the glass tube.

Figure 10:
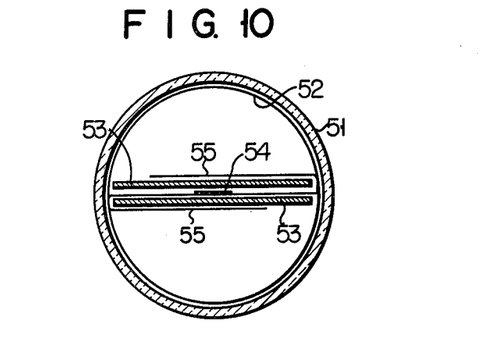
FIG. 10 is a sectional view showing an eventual discharge electrode plate in a manufacturing step to produce an example of the discharge electrode plate according to the invention.
Figure 11:
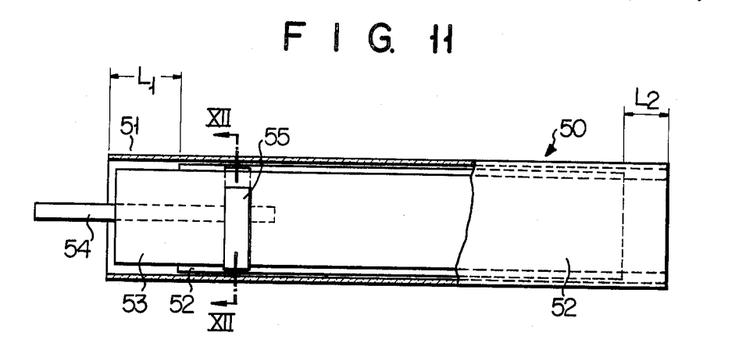
FIG. 11 is a view, partly broken away, showing an example of the discharge electrode plate according to the invention.
Figure 12:
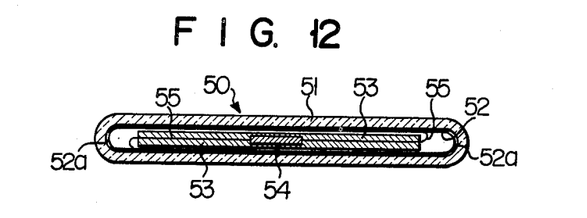
FIG. 12 is an enlarge-scale sectional view taken along line XII—XII in FIG. 11.

FIGS. 10 to 12 show a first example of the discharge electrode plate. As shown in FIG. 10, a high voltage electrode 52 is produced by coating a graphite powder paint on the inner surface of the glass tube 51 of lead glass by the ordinary method and then applying a coil of an aluminum foil to the coating for increasing the conductivity. Then, two mica sheets 53 reinforced with silicone varnish are inserted into the glass tube 51. The mica sheets 53 have a width substantially equal to the inner diameter of the glass tube 51 and a length substantially equal to the length of the glass tube 51. Subsequently, an ordinary lead conductor 54, for example a non-inductive steel net cut into a ribbon-like form, is inserted between the two mica sheets 53 such that it will not touch the high voltage electrode 52, and then a ribbon-like aluminum foil 55 with a thickness of about 20 μm is assembled to connect the lead conductor 54 and the high voltage electrode 52. The resultant glass tube structure as shown in FIG. 10 is then flattened in a heating furnace as shown in FIG. 7 to obtain a discharge electrode plate 50 as shown in FIGS. 11 and 12. In this discharge electrode plate 50, the flat hollow glass tube (i.e., dielectric member) 51 has a length of 1,300 mm, a width of 80 mm and a thickness of 6 mm. The high voltage electrode 52 is formed over a central portion of the dielectric member 51 to provide sufficient creeping distances $L_1$ and $L_2$ from the opposite ends of the dielectric member 51. When $L_1 = 200$ mm and $L_2 = 100$ mm, the length of the high voltage electrode 52 in this case is 1,000 mm. The length of the high voltage electrode is made substantially equal to the length of the grounded electrode. The lead conductor 54 has a length of 400 mm, and the ribbon-like aluminum foil (i.e., connecting means) 55 which is provided near the end of the lead conductor 54 on the side of the high voltage electrode 52 has a width of 50 mm. The total thickness of the two mica sheets 53 as the spacer material is about 2 mm. Since the spacer material 53 is held in a clamped state within the dielectric member 51, the opposite edges 52a of the high voltage electrode 52 have a curved form having a suitable radius.

Figure 13:
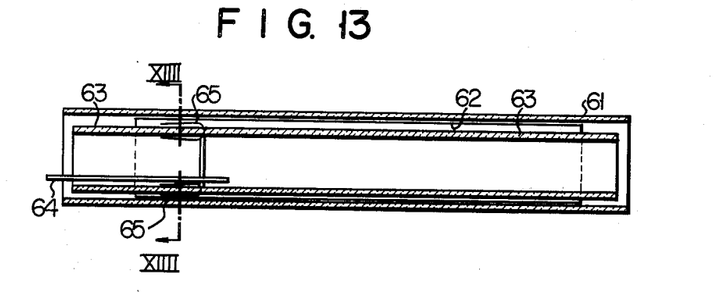
FIG. 13 is a sectional view showing an eventual discharge electrode plate in a manufacturing step to produce another example of the discharge electrode plate according to the invention.
Figure 14:
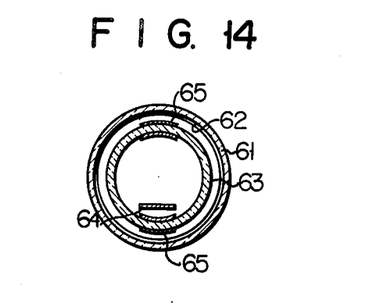
FIG. 14 is a sectional view taken along line XIII—XIII in FIG. 13.
Figure 15:
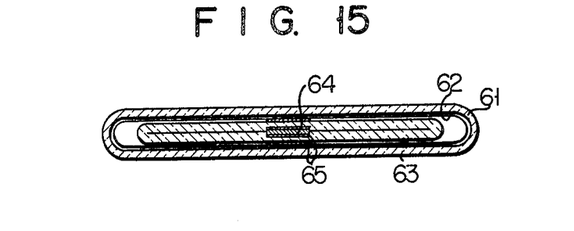
FIG. 15 is an enlarged-scale sectional view taken along the same line in FIG. 14, showing the discharge electrode plate produced through the step shown in FIGS. 13 and 14.

FIGS. 13 to 15 show a second example of the discharge electrode plate, which uses a glass tube as the spacer material. As shown in FIGS. 13 and 14, a high voltage electrode 62 consisting of a graphite powder paint coating and an aluminum foil is formed on the inner surface of a glass tube 61 similar to the first example, and a spacer glass tube 63 is then inserted. The spacer glass tube 63 has substantially the same length as the outer glass tube 61, but it is cut at a position corresponding to the inner end of a lead conductor 64 which is inserted into the glass tube 63. Ribbon-like aluminum foils 65 are provided through the cut portion of the spacer glass tube 63 such that they overlap the inner and outer sides thereof to connect the lead conductor 64 and the high voltage electrode 62. Then, the lead conductor 64 is inserted, and the resultant assembly is inserted into and heated in a heating furnace as shown in FIG. 7 to flatten the outer tube and spacer tube, thus obtaining the discharge electrode plate as shown in FIG. 15.

Figure 16:
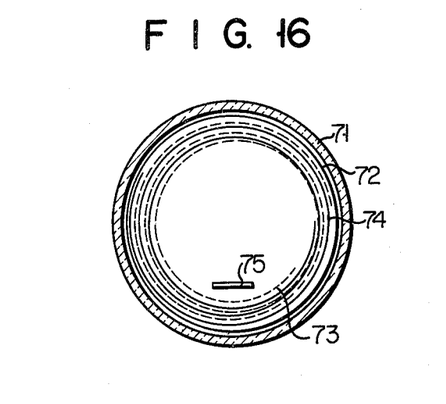
FIG. 16 is a sectional view showing an eventual discharge electrode plate in a manufacturing step to produce a further example of the discharge electrode plate according to the invention.

A third example of the discharge electrode plate will now be described with reference to FIG. 16. In this case, a high voltage electrode 72 is formed by the ordinary chemical plating method on the inner surface of a glass tube 71, and then a ribbon-like aluminum foil 73 (shown by dashed line) and an asbestos sheet 74 impregnated with water glass 74 (shown by solid line) are wound in an overlapped state and inserted into the glass tube 71. Further, a lead conductor 75 is inserted into the winding of the aluminum foil 73 and asbestos sheet 74.

The ribbon-like aluminum foil 73 connects the lead conductor 74 and the high voltage electrode 72, so that it has to be sufficiently exposed from the inner and outer ends of the asbestos sheet 74 overlapped over it. The assembly shown in FIG. 16 is heated in a heating furnace as shown in FIG. 7 to flatten the glass tube and obtain a flat discharge electrode plate.

Since in the discharge electrode plate, the opposite edges of the high voltage electrode have a curved form having a suitable curvature, the dielectric member in contact with the opposite edges does not undergo dielectric breakdown.

Figure 17:
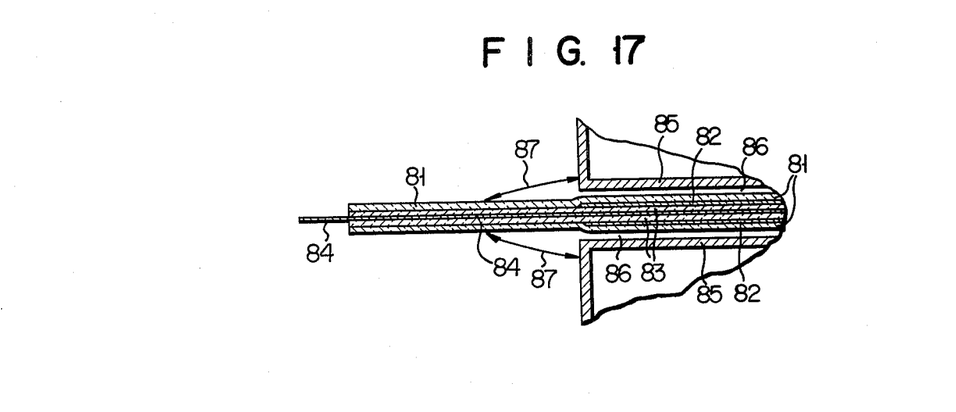
FIG. 17 is a fragmentary sectional view showing part of an ozonizer according to the invention.

The ozonizer according to the invention can further prevent creeping discharge from occurring in portions where the dielectric member projects from the grounded electrode. This effect will be discussed with reference to FIG. 17. In FIG. 17, the connecting means is not illustrated.

Since a lead conductor 84 is connected to an external high AC voltage source (not shown), the same high voltage is applied to the lead conductor 84 and a high voltage electrode 82, so that with a voltage higher than a certain value a creeping discharge is caused to take place over a portion as shown by arrows 87 (a creeping portion) of the surface of a dielectric member 81 protecting from a grounded electrode 85 concurrently with corona discharge produced across the space 86 between the high voltage electrode 82 and grounded electrode 85. This creeping discharge must be prevented since it deteriorates the ozone generation efficiency and, if it extends up to the exposed portion of the lead conductor 84, disables the operation of the ozonizer. The voltage V which produces the creeping flashover is expressed as $$V = \frac{Kb}{8\sqrt{C^3}} \cdot 4\sqrt{l}$$

where C is the intrinsic electrostatic capacitance (in $F/m^2$) of the dielectric member, l is the creeping distance (m), and Kb is a constant.

This equation indicates that the creeping flashover voltage is increased by reducing the electrostatic capacitance per unit area of the dielectric member. The electrostatic capacitance is proportional to the dielectric constant of the dielectric material and inversely proportional to the thickness thereof. In case that the spacer material 83 in the construction of FIG. 17 is absent, the instrinsic electrostatic capacitance is determined solely by the thickness and dielectric constant of the dielectric member 81. With the spacer material 83 provided, the intrinsic electrostatic capacitance is reduced since it is now determined by the sum of the thickness of the dielectric member 81 and that of the spacer material 83, so that the creeping flashover voltage is increased. This means that the spacer material 83 permits stable operation even with a high applied voltage. The spacer material 83 is thus preferably a dielectric material and projects from the grounded electrode and high voltage electrode at least by the creeping distance.

What we claim is:

1. An ozonizer in which a high voltage electrode and a grounded electrode are disposed with an interposed dielectric member, comprising:
   (a) a grounded electrode essentially consisting of a flat hollow metal tube;

(b) a flat hollow dielectric member held inside said grounded electrode and spaced apart therefrom by a discharge space;

(c) a high voltage electrode formed on the inner surface of said dielectric member;

(d) a spacer material provided within and held in a clamped state by said dielectric member carrying said high voltage electrode, said spacer material having a sufficient thickness to ensure that the opposite edges of said high voltage electrode have a curved surface;

(e) a lead conductor inserted in said spacer material and serving to pass current to said high voltage electrode; and (f) a connecting means consisting of a conductor connecting said lead conductor and said high voltage electrode.

2. An ozonizer according to claim 1, wherein said spacer material is a heat-resistant material.

3. An ozonizer according to claim 1, wherein said spacer material is a dielectric material.

4. An ozonizer according to claim 3, wherein said spacer material is at least one selected from the group consisting of a mica sheet, a glass cloth, an asbestos cloth and a glass tube.

5. An ozonizer according to claim 3, wherein said spacer material projects from the opposite ends of said high voltage electrode at least by the creeping distance.

6. An ozonizer according to claim 1, wherein said spacer material has a thickness within a range between 1 and 3 mm.

7. An ozonizer according to claim 1, wherein said connecting means is an aluminum foil.

8. An ozonizer according to claim 1, wherein said dielectric member is a glass tube.

9. An ozonizer according to claim 1, wherein said high voltage electrode is a conductive coating or an aluminum foil.

10. A discharge electrode plate for an ozonizer which has a high voltage electrode formed on the inner surface of a dielectric member and a lead conductor for passing current to said high voltage electrode, comprising:

(a) a flat hollow dielectric member provided on the inner surface thereof with said high voltage electrode;

(b) a spacer material provided within and held in a clamped state by said dielectric member and having a sufficient thickness to ensure that the opposite edges of said high voltage electrode have a curved surface, the lead conductor being provided within and held in a clamped state by said spacer material; and (c) a connecting means consisting of a conductor connecting said lead conductor and said high voltage electrode.

11. A discharge electrode plate according to claim 10, wherein said spacer material is a heat-resistant dielectric material.

12. A discharge electrode plate according to claim 10, wherein said spacer material has a thickness within a range between 1 and 3 mm.

13. A discharge electrode plate according to claim 10, wherein said spacer material projects from the opposite ends of said high voltage electrode at least by the creeping distance.

14. A discharge electrode plate according to claim 10, wherein said spacer material is two mica sheets, glass cloths or asbestos cloths, and also wherein said connecting means consists of an aluminum foil extending within said spacer material and connecting said lead conductor provided within said spacer material and said high voltage electrode.

15. A discharge electrode plate according to claim 10, wherein said spacer material is a flattened glass tube, and also wherein said connecting means consists of aluminum foils penetrating an intermediate cut portion of said glass tube and connecting said lead conductor provided within said glass tube and said high voltage electrode.

16. A discharge electrode plate according to claim 10, wherein said spacer material is a mica sheet, a glass cloth or an asbestos cloth in a wound form, and also wherein said connecting means is a ribbon-like aluminum foil wound in an overlapped relation to said spacer material and connecting said lead conductor which is provided within said winding and said high voltage electrode.

17. A method of manufacturing a discharge electrode plate for an ozonizer, which comprises a dielectric member provided on the inner surface thereof with a high voltage electrode and a lead conductor for passing current to said high voltage electrode, said method comprising:

(a) a step of forming said high voltage electrode on the inner surface of a tubular dielectric member;

(b) a step of inserting a spacer material into said tubular dielectric material;

(c) a step of inserting a lead conductor into said spacer material such that said lead conductor does not contact said high voltage electrode;

(d) a step of connecting said lead electrode and said high voltage electrode with a connecting means; and (e) a step of flattening the resultant assembly including said tubular dielectric member under a heating condition.

18. A method of manufacturing a discharge electrode plate according to claim 17, wherein in said flattening step said spacer material inserted in said tubular dielectric material helps to ensure that the opposite edges of the flattened high voltage electrode have a curved surface.

19. A method of manufacturing a discharge electrode plate according to claim 18, wherein said spacer material has a thickness within a range between 1 and 3 mm.

* * * * *